United States Patent

[11] 3,577,102

[72] Inventor Joseph Gindsberg
Brookline, Mass.

[21] Appl. No. 787,914
[22] Filed Dec. 30, 1968
[45] Patented May 4, 1971
[73] Assignee Raytheon Company
Lexington, Mass.

[54] SUM-OR-SELECT NETWORK HAVING SHORT CIRCUITING MEANS CONNECTABLE TO HYBRID TEE CIRCUIT
7 Claims, 5 Drawing Figs.

[52] U.S. Cl. .......... 333/7, 333/11
[51] Int. Cl. .......... H01p 1/10
[50] Field of Search .......... 333/7, 11, 985; 331/49; 325/367, 370

[56] References Cited
UNITED STATES PATENTS

| | | | |
|---|---|---|---|
| 2,576,943 | 12/1951 | Jenks | 333/7X |
| 2,842,745 | 7/1958 | Burton | 333/11X |
| 3,403,357 | 9/1968 | Rosen et al. | 333/7X |

*Primary Examiner*—Paul L. Gensler
*Attorneys*—Harold A. Murphy and Joseph D. Pannone

ABSTRACT: This invention relates to a sum-or-select network for connecting two coherent sources of electrical power to a useful load such that the total available power from both sources, or either source alone, can be applied to the load with minimum loss. The network uses a single hybrid tee which can be connected to suitably placed short-circuit terminations if the power from either source fails.

INVENTOR
JOSEPH GINDSBERG
BY Irving S. Rappaport
ATTORNEY

INVENTOR
JOSEPH GINDSBERG
BY Irving S. Rappaport
ATTORNEY

SUM-OR-SELECT NETWORK HAVING SHORT CIRCUITING MEANS CONNECTABLE TO HYBRID TEE CIRCUIT

BACKGROUND OF THE INVENTION

The present invention was conceived as a solution to the following problem. Given two coherent sources of electrical power, A and B (such as two phase-locked oscillators or two power amplifiers with common input), it may be desired to connect them to a useful load through a network capable of operating in any of the three following modes: (1) Mode AB: The output load receives the sum of the available powers from A and B: (2) Mode A: The load receives the available power from A and is isolated from B; and (3) Mode B: The load receives the available power from B and is isolated from A. Mode AB typically represents normal operation of a high-power transmission system, while Modes A and B may be required for emergency operation when one of the two sources fails.

The conventional solution to this problem utilizes a hybrid sum-difference network and three ganged switches (two single-pole, double-throw and one single-pole, triple-throw). The switching is required to avoid the occurrence of a 6-db. reduction in output power (instead of 3-db.) upon the loss of one of the two power sources. The sum-or-select network of the present invention simplifies switching and offers a more reliable, lower-cost solution to the problem. The invention allows for the fail-safe addition of power from two or more sources without elaborate switching. Moreover, by eliminating the waveguide switches in microwave applications, the present invention offers a lower insertion loss in the sum mode (Mode AB). A very simple extension to the sum-or-select problem for a greater number of sources can be accommodated by interconnecting several of these networks.

SUMMARY OF THE INVENTION

The above advantages and features of the present invention, as well as others, may be accomplished by providing a sum-or-select network for combining at least two input sources into a single output with the capability of selecting any one such input source with minimum power loss, the network comprising a hybrid tee circuit and a plurality of short-circuiting means to which the tee circuit can be suitably connected if the power from any source fails, or varies by falls a predetermined percentage of the other sources.

DESCRIPTION OF THE PREFERRED EMBODIMENTS

Figures 2, 3:
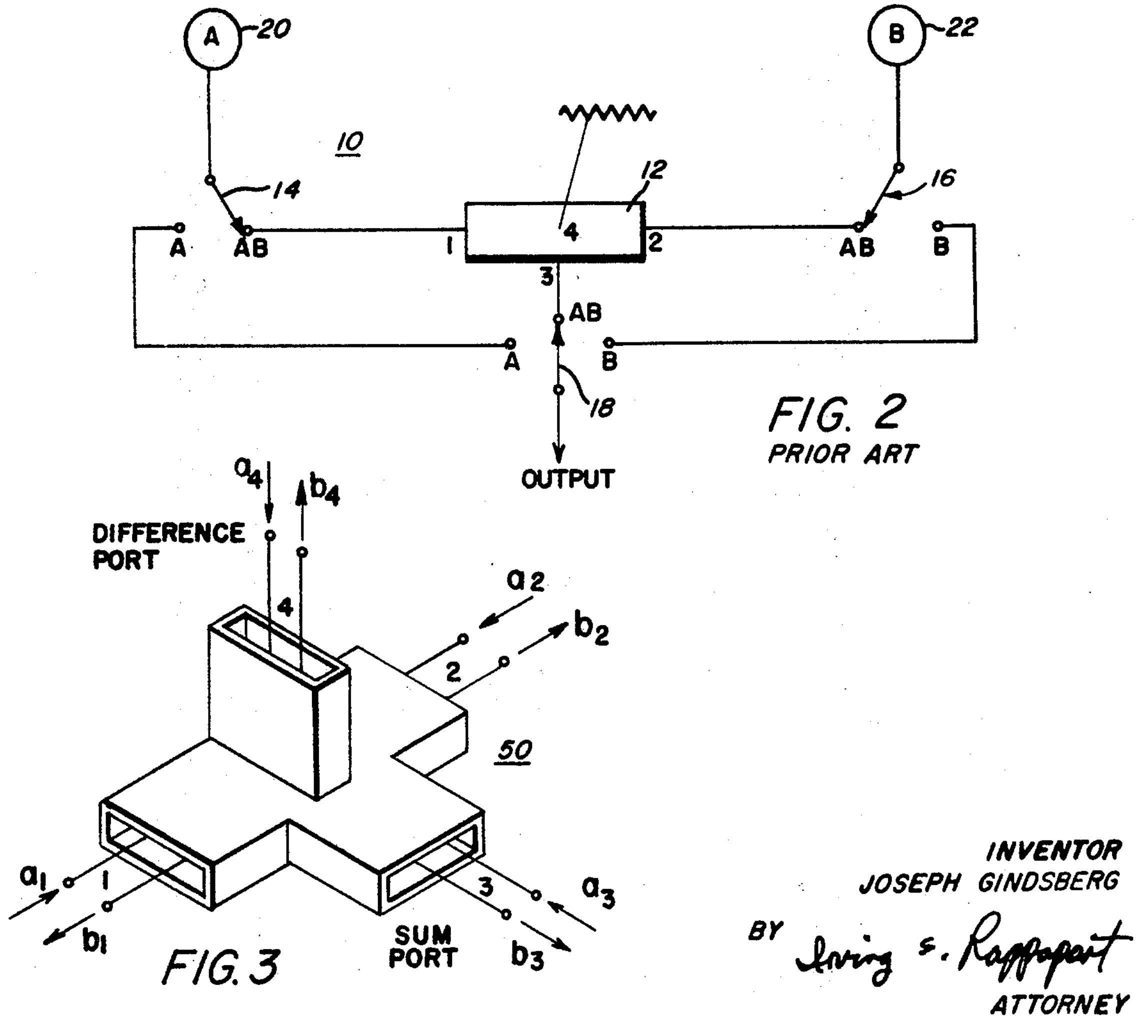
FIG. 2 PRIOR ART, FIG. 3
FIG. 2 is a circuit diagram of the prior art.
FIG. 3 is a circuit diagram illustrating operation of a waveguide hybrid junction (magic tee) in the present invention.

FIG. 2 shows a circuit diagram of the typical prior-art network 10 having a hybrid sum-difference circuit 12 having four parts (1, 2, 3 and 4) and three ganged switches 14, 16 and 18. A-input source 20 and B-input source 22 provide the power inputs to the network. Switches 14 and 16 are single-pole, double-throw switches to permit combination of the A and B input sources 20 and 22 or the selection of only one of the sources. Switch 18 is a single-pole, triple-throw switch which provides the output with either the summation of the A and B sources 20 and 22 or with only one of the sources. This elaborate switching scheme is necessary to prevent the occurrence of a 6-db. reduction in power upon the loss of one of the two power sources.

Figure 1:
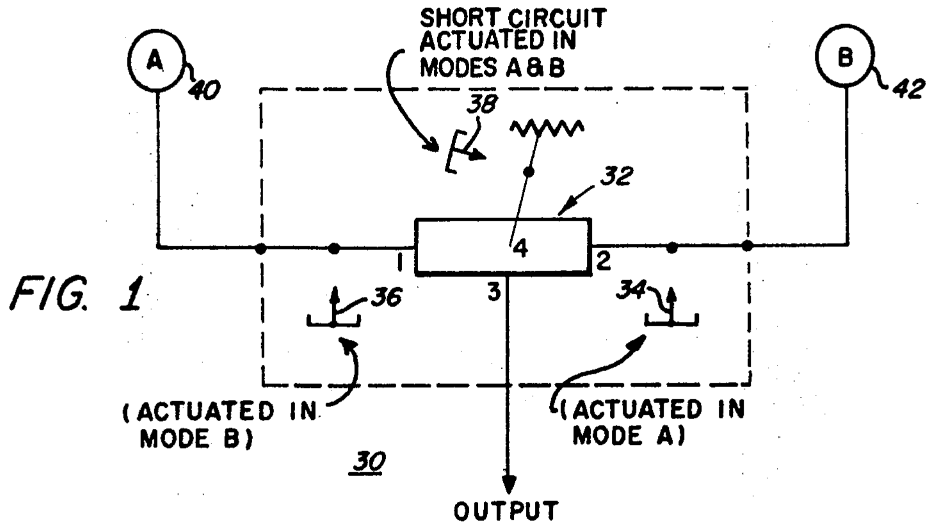
FIG. 1 is a circuit diagram of the sum-or-select network of the present invention.

The sum-or-select network 30 of the present invention is shown schematically in FIG. 1. It consists of a hybrid circuit 32 having four ports (1, 2, 3 and 4) and three short circuit switches 34, 36 and 38. At least one of these switches is out of the circuit in any given operating mode. The short circuits (which can take the form of relay-operated pins in waveguide) must be suitably placed with respect to the hybrid circuit 32, but the exact position is not critical, as will be shown. A-input source 40 and B-input source 42 provide the power inputs to the network 30. Switch 34 is actuated in Mode A (load receives power from A and is isolated from B); switch 36 is actuated in Mode B (load receives power from B and is isolated from A); switch 38 must be actuated in Modes A and B and may also, in some cases, be left operative in Mode AB when A and B are closely balanced (load connected to both A and B).

FIG. 3 illustrates operation of the present invention when utilizing a magic-tee waveguide hybrid circuit 50 having four ports shown as 1, 2, 3 and 4 respectively. Port 3 is the sum port and port 4 is the difference port. Operation of the hybrid network 50 can be expressed in terms of a scattering matrix $\bar{S}$, which relates the input and output wave vectors $a$ and $b$ (column vectors with four components) by the matrix equation:

$b=\bar{S}a$ (1 $a$) The form of the scattering matrix corresponding to the magic-tee waveguide hybrid network 50 is given below but the discussion is equally valid for any lossless hybrid network at any frequency.

$$\underset{b}{\begin{bmatrix} b_1 \\ b_2 \\ b_3 \\ b_4 \end{bmatrix}} = \underset{\bar{S}}{\frac{1}{\sqrt{2}}\begin{bmatrix} 0 & 0 & 1 & 1 \\ 0 & 0 & 1 & -1 \\ 1 & 1 & 0 & 0 \\ 0 & -1 & 0 & 0 \end{bmatrix}} \underset{a}{\begin{bmatrix} a_1 \\ a_2 \\ a_3 \\ a_4 \end{bmatrix}} \quad (1b)$$

A good discussion of the scattering matrix of the magic-tee hybrid junction is found in "Microwave Circuits" by Jerome L. Altman, D. van Nostrand Co., Inc., Princeton 1964, page 64.

In the summing mode (Mode AB), consider that Ports 1 and 2 are fed by the voltages $a_1$ and $a_2$, while the useful matched load is connected to Port 3 ($a_3=0$), and an arbitrary load (with reflection coefficient $r_4$) is connected to Port 4 ($a_4=r_4b_4$). Under these conditions, Eq. (1) takes the form:

$$b_1=\frac{1}{\sqrt{2}}r_4b_4=-b_2$$

$$b_3=\frac{1}{\sqrt{2}}(a_1+a_2)$$

$$b_4=\frac{1}{\sqrt{2}}(a_1-a_2)$$

hence:

$b_1=-b_2r_4(a_1-a)/2$ (2)

For equal input voltages ($a_1=a_2=1$), these relations indicate the familiar results $b_3=\sqrt{2}$,or 2 units of output power at the sum port, and $b_1=b_2=0$, i.e. perfect input match, regardless of the impedance connected to the difference port (Port 4).

This independence of $r_4$ allows the permanent connection of a short circuit to Port 4 (at least in certain applications) for reasons explained below.

In Mode A, the single input is applied to Port 1 and short circuits are connected to Ports 2 and 4. These conditions imply:

$a_1=1$, $a_2=r_2b$, $a_4=r_4b$, where, for lossless short circuits, $r_2=e^{1j\phi}2$, $r_4=e^{1j\phi}4$, and the $\theta$'s represent two-way phase shifts between the shorts and suitable reference points on the hybrid.

Substitution into the matrix equation $b=\bar{S}a$ yields, $$b_1=\frac{1}{\sqrt{2}}r_4b_4=b_2$$

$$b_3=\frac{1}{\sqrt{2}}(1+r_2b_2)$$

$$b_4=\frac{1}{\sqrt{2}}(1-r_2b_2)$$

This system of simultaneous equations is solved for the output waves at the input and output ports. The results are:

$$b_1=\frac{1}{r_2}\frac{x}{1-x}$$

$$b_3=\frac{1}{\sqrt{2}}\frac{1-2x}{1-x}$$

where $$x=\tfrac{1}{2}r_2r_4=\tfrac{1}{2}e^{-i\phi}$$

$$\phi=\phi_2+\phi_4$$

Let R designate the fraction of the available input power which is reflected through Port 1 towards Source A, and T be the fraction of power transmitted via Port 3. These fractions are:

$$R=|b_1|^2=\left|\frac{x}{1-x}\right|^2=\frac{1}{5-4\cos\phi} \quad (3)$$

(which is valid in the lossless-short case where $|r_2|=|r_4|=1$), and $$T=|b_3|^2=\tfrac{1}{2}\left|\frac{1-2x}{1-x}\right|^2=1-R \quad (4)$$

As cos $\theta$ can vary from −1 to +1, it follows, by (3), that the power reflection factor covers the range R=1/(5±4), i.e. from 1/9 to 1; the corresponding range of the power transmission factor T is 8/9 to 0.

Figure 4:
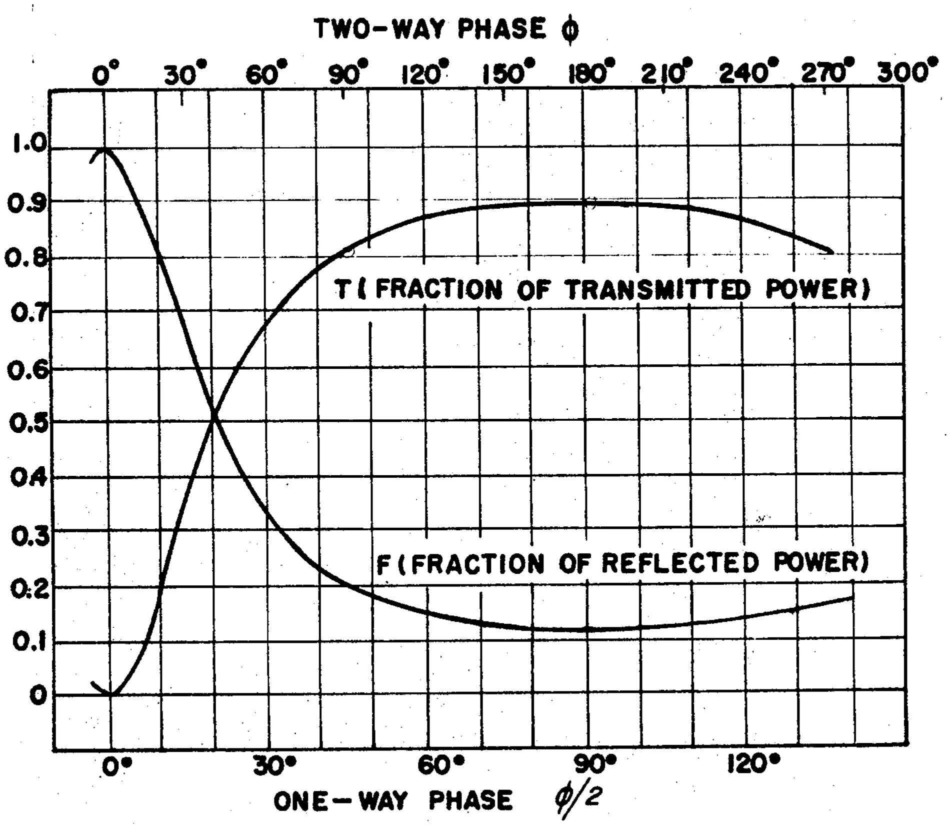
FIG. 4 is a graph showing the sum-or-select power relations in a single-source mode of operation of the invention.

FIG. 4 is a plot of Equations (3) and (4) showing the sum-or-select power relations for the single-source modes of operation. The optimum transmission at $\theta$=180° (one-way phase value $\theta/2$=90°) is $T_{max}$=8/9=88.9 percent =−0.51 db. (5) This result represents an input voltage-reflection coefficient $\sqrt{R}$=1/3 and a voltage standing-wave ratio (VSWR) of 2:1. One can, of course, switch a suitably phased matching structure of the same VSWR into the input arm (Port 1) at the same time that the short circuit is placed into Port 2. However, the recovery of 0.51 db. of loss (under ideal conditions) will not be worth the added complexity in most practical applications.

With the interchange of the conditions at Ports 1 and 2, the operation for Mode B follows from that discussed for Mode A. Note that the short circuit at the difference port, $|r_4|=1$, need not be switched but can remain in place for all three modes, at least in the majority of applications in which the two input levels are more or less balanced and where the cross-feed, represented by Eq. (2) can be tolerated in Mode AB. In fact, such cross-feed can be used to help assure the coherence of the two input sources.

The transmission optimum is very broad as seen in FIG. 4. Thus, a one-way error of ±25° (±0.7 wavelength) in the short positions will increase the insertion loss by only 0.1 db. over the minimum value of 0.51 db. The phasing of the circuit is therefore not excessively critical and a good broadband operating capability is indicated.

When two unbalanced inputs ($a_1$=1 from source A, and $a_2$< 1 from source B) are available and a matched load is connected to Port 4 in Mode AB, switchover to Mode A is indicated if the Mode-AB output power.

$$T_{AB}=\frac{1}{\sqrt{2}}|(1+a_2)|^2$$

falls below the Mode-A optimum, $$T_{max.}=\frac{8}{9}.$$

This occurs when the B-input power, $|a_2|^2$, is less than 1/9 or 11.1 percent (−9.5 db.) relative to the available power from Source A.

A microwave implementation of the sum-or-select network of the present invention has been tested in waveguide at 16.5 GHz. The power transmission and reflection in Mode A was measured as a function of short circuit position, and excellent agreement with the theory was achieved.

Figure 5:
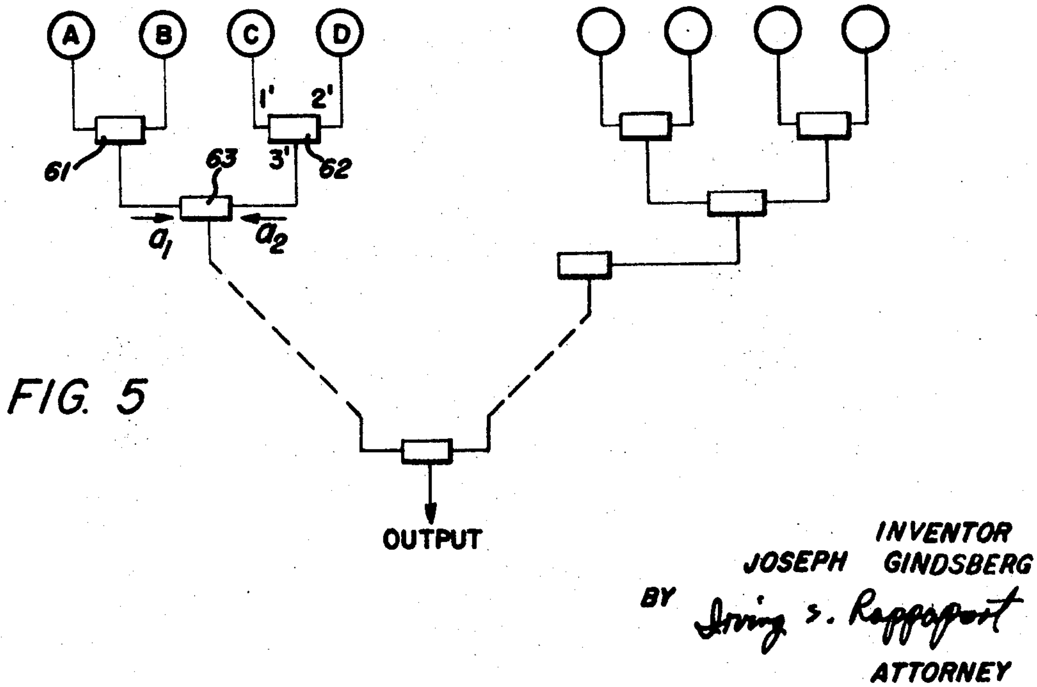
FIG. 5 is a block diagram illustrating extension of the invention to a multiple-source configuration.

FIG. 5 suggests a summing tree for $2^N$ sources by means of $2^N$—1 hybrids 32 shown in FIG. 1. The hybrids closest to the sources operate in the three sum-or-select modes A, B, or AB; C, D or CD, etc., as previously described; but the other hybrids are provided with short circuit terminations only when the power available from one arm is negligible (less than one-ninth) compared to the other.

Considers the case of four sources, each producing 1 unit of power. If either source C or D is disabled, the appropriate short-circuited terminations are placed into the C-D sum-or-select network 62, so that it provides an output of 8/9 unit of power in accordance with Eq. (5) above.

The corresponding normalized voltage is $\sqrt{8/9}=(2/3)\sqrt{2}$. This signal is to be combined with the 2-unit power output (voltage $=\sqrt{2}$) from the A-B sum-or-select network 61. These signals are applied to the third network 63 as inputs $a_2$ and $a_1$, respectively, without modifying the operation of the network 63 in any way from its condition for the coherent addition of all four sources. The signals which the sum and difference arms of the hybrid in network 63 deliver to their respective matched loads are therefore $b_3(a_1+a_2)/\sqrt{2}$=1+2/3=5/3 and $b_4$=$(a_1-a_2)/\sqrt{2}$=1−2/3=1/3. The corresponding values of output power and dissipation loss are T=$|b_3|^2$=25/9 and L=$|b_4|^2$=19. The reflection loss (in the D or C input port), is still R=1/9, accounting for the total applied power P=T+L+R=3.

The overall transmission efficiency of the four-source network, with one source disabled, is therefore T/P=25/27=92/6 percent or −0.33 db. (compared with 24/27 for the basic two-source network). If one source fails on each input arm of network 63 (such as A and C0, the hybrid in 63 is balanced as with four inputs and delivers the full available power. The short circuits are inserted only if both sources in one input arm are disabled (A and B or C and D), or lose more than 9.5 db. of normal power.

The primary application of the sum-or-select network of the present invention is considered to be the addition of microwave power from coherent sources (amplitrons, klystron and amplifiers, etc.) in high-power transmitters. Each source is monitored (via directional couplers and diode detectors), and suitable logic circuits turn off any faulted source and initiate the insertion of relay-operated short circuit pins into the appropriate waveguide sections. The monitoring and logic elements are well known in the transmitter art. The 2:1 VSWR presented to the remaining input source is either absorbed in an isolator or is matched out by dropping a matching pin into its waveguide connection to the hybrid. The sum-or-select network could also find application as a versatile single-pole, double-throw switch for coherent AC signals with a third "throw" for power summing. Switching may take place in response to various requirements besides failure of an input source.

I claim:

1. A sum-or-select network for combining at least two input sources into a single output with the capability of selecting any one such input source with minimum power loss, the network comprising:

a hybrid tee circuit including a termination port supplied by said input sources; and means for connecting a plurality of short-circuiting means to said hybrid circuit when the power from any source becomes less by a predetermined percentage relative to the other sources, said short circuits being connected in at least one input port and in said termination port.

2. A sum-or-select network for connecting two coherent sources of electrical power to a useful load such that the total available power from both sources, as well as the power from either source alone, can be applied to the load with minimum loss when one source fails, said network comprising:

a single hybrid tee circuit having two input terminals and one output terminal, the input terminals being supplied from two independent power sources and the output terminal normally carrying the combined output of the two sources; and means for connecting separate short-circuiting means to either of the power sources when the power from either source falls to a predetermined percentage of the other source, such that the failing source is short-circuited.

3. A network as set forth in claim 2 including another short-circuiting means connected to a matched termination port when either power source fails.

4. A sum-or-select network for connecting two coherent microwave sources to a useful load such that total available power from both sources, as well as the power from either source alone, can be applied to the load with minimum loss when one source fails, said network comprising:

a single hybrid circuit having two input terminals, one output terminal and one difference terminal, the input terminals being supplied from two independent microwave sources, the output terminal normally carrying the combined output of the two sources and, the difference terminal normally carrying power resulting from imbalance into a matched load;

means for connecting short-circuiting means to either of the microwave sources when the power from either source falls to a predetermined percentage of the other source such that the failing source is short-circuited; and a third short-circuiting means to which the difference port of the hybrid tee is connected when either microwave source fails.

5. A sum-or-select network for connecting two coherent microwave sources to a useful load such that total available power from both sources, as well as the power from either source alone, can be applied to the load with minimum loss, said network comprising:

two input terminals to which independent microwave sources are supplied;

a single hybrid tee circuit including a sum port from which the sum of said microwave sources is derived and a difference port said input terminals being input ports on said hybrid tee, said sum port normally carrying the output from said hybrid circuit, which output represents the combined sources supplied from the input terminals;

means for connecting a separate short-circuiting switch to either of the two input terminals to short out the corresponding source when that source has fallen below a predetermined percentage of the other source; and means for connecting a third short-circuiting switch to the different port when either source fails.

6. A sum-or-select network for combining at least two input sources into a single output when one source fails comprising:

at least one hybrid tee circuit supplied by said input sources; and means for connecting a plurality of short-circuiting means to said at least one hybrid tee when the power from any input source becomes less by a predetermined amount relative to another input source, said short-circuiting means being connected to the input port corresponding to the failing source.

7. A sum-or-select network for combining first and second input power sources into a single output comprising:

a hybrid circuit;

means for connecting first and second short-circuiting means to said first and second power sources respectively when the power from either source becomes less by a predetermined amount relative to the other source, said short-circuiting means being connected to the changed source; and means for connecting third short-circuiting means to a matched termination port of the hybrid when either said first or second short circuit means is connected to said first or second input power source respectively.

UNITED STATES PATENT OFFICE
CERTIFICATE OF CORRECTION

Patent No. 3,577,102 Dated May 4, 1971

Inventor(s) Joseph Gindsberg

It is certified that error appears in the above-identified patent and that said Letters Patent are hereby corrected as shown below:

In the Specification

Column 1, line 47, change "or varies by falls" to -- falls or varies by --

Column 1, line 64, change "parts" to -- ports --

Column 2, lines 14 and 15, change "when A and B are closely balanced (load connected to both A and B)" to -- (load connected to both A and B) when A and B are closely balanced --

Column 2, line 24, change "$b = \bar{S}a$" to -- $\underline{b} = \bar{S}\underline{a}$ --

Column 2, line 56, change "$b_1 = -b_2 r_4 (a_1 - a) /2$" to -- $b_1 = -b_2 = r_4 (a_1 - a) /2$ --

Column 2, line 68, change "$a_2 = r_2 b,$" to -- $a_2 = r_2 b_2,$ --

Column 2, line 69, change "$a_4 = r_4 b,$" to -- $a_4 = r_4 b_4,$ --

Column 2, line 71, change "$r_2 = e^{1j\phi}2,$" to -- $r_2 = e^{-j\phi}2,$ --

Column 2, line 72, change "$r_4 = e^{1j\phi}4,$" to -- $r_4 = e^{-j\phi}4,$ --

Column 2, line 73, change "$\theta$'s" to -- $\phi$'s --

FORM PO-1050 (10-69)

USCOMM-DC 60376-P69
☆ U.S. GOVERNMENT PRINTING OFFICE : 1969 O—366-334

UNITED STATES PATENT OFFICE

CERTIFICATE OF CORRECTION

Patent No. 3,577,102 Dated May 4, 1971

Inventor(s) Joseph Gindsberg

It is certified that error appears in the above-identified patent and that said Letters Patent are hereby corrected as shown below:

Column 3, lines 11 to 20, change $$"b_1 = \frac{1}{r_2} \frac{x}{1 - x}$$

where $$b_3 = \frac{1}{\sqrt{2}} \frac{1 - 2x}{1 - x}$$

$$x = 1/2\ r_2 r_4 = 1/2\ e^{-j\phi}$$

$$\phi = \phi_2 + \phi_4"$$

to $$\text{--}\ b_1 = \frac{1}{r_2} \frac{x}{1 - x}$$

$$b_3 = \frac{1}{\sqrt{2}} \frac{1 - 2x}{1 - x}$$

where $$x = 1/2\ r_2 r_4 = 1/2\ e^{-j\phi}$$

$$\phi = \phi_2 + \phi_4\ \text{--}$$

Column 3, line 33, change "$\theta$" to -- $\phi$ --

Column 3, line 39, change "$\theta = 180^o$" to -- $\phi = 180^o$ --

Column 3, line 40, change "$\theta/2 = 90^o$)" to -- $\phi/2 = 90^o$) --

Column 4, line 16, change "Considers" to -- Consider --

USCOMM-DC 60376-P69
☆ U.S. GOVERNMENT PRINTING OFFICE : 1969 O—366-334

UNITED STATES PATENT OFFICE
CERTIFICATE OF CORRECTION

Patent No. 3,577,102 Dated May 4, 1971

Inventor(s) Joseph Gindsberg

It is certified that error appears in the above-identified patent and that said Letters Patent are hereby corrected as shown below:

Column 4, line 18, change "circuited" to -- circuit --

Column 4, line 32, change "$L = |b_4|^2 = 19.$" to -- $L = |b_4|^2 = 1/9.$ --

Column 4, line 38, change "CO," to -- C), --

Column 4, line 46, omit "and"

Column 4, line 70, after "hybrid" insert -- tee --

Column 5, line 21, after "hybrid" insert -- tee --

Column 6, line 5, after "port" insert -- , --

Column 6, line 7, after "hybrid" insert -- tee --

Column 6, line 27, after "hybrid" insert -- tee --

Column 6, line 35, after "hybrid" insert -- tee --

Column 6, line 36, change "short circuit" to -- short-circuiting --

Signed and sealed this 16th day of May 1972.

(SEAL)
Attest:

EDWARD M. FLETCHER, JR
Attesting Officer

ROBERT GOTTSCHALK
Commissioner of Patents

USCOMM-DC 60376-P69
☆ U.S. GOVERNMENT PRINTING OFFICE 1969 O—366-334